Feb. 12, 1924.
H. EICHNER
BURNER CHAMBER FOR ROTARY BAKING OVENS
Filed Sept. 24, 1921
1,483,167
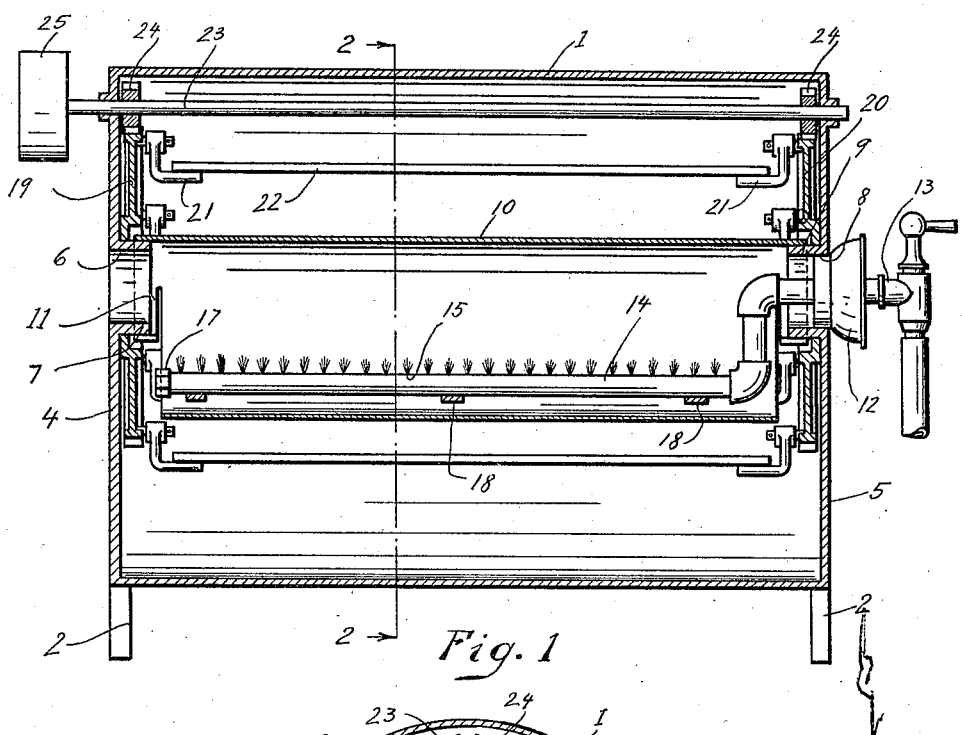
Fig. 1
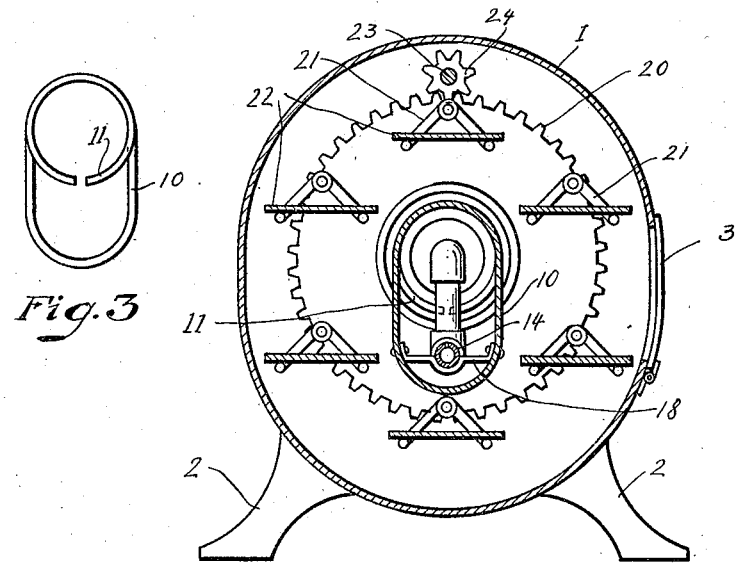
Fig. 3
Fig. 2
Witnesses:
Inventor
Henry Eichner
By Joshua R H Potts
His Attorney Patented Feb. 12, 1924.

1,483,167

UNITED STATES PATENT OFFICE.

HENRY EICHNER, OF CHICAGO, ILLINOIS.

BURNER CHAMBER FOR ROTARY BAKING OVENS.

Application filed September 24, 1921. Serial No. 502,960.

*To all whom it may concern:*

Be it known that I, HENRY EICHNER, a citizen of the United States, and a resident of the city of Chicago, county of Cook, and State of Illinois, have invented certain new and useful Improvements in Burner Chambers for Rotary Baking Ovens, of which the following is a specification.

This invention relates to burner chambers for rotary baking ovens, and has for its object the provision of a device of this character which will be simple in construction and efficient and economical in operation.

Other objects will appear hereinafter.

The invention consists in the combinations and arrangements of parts hereinafter described and claimed.

The invention will be best understood by reference to the accompanying drawings forming a part of this specification, and in which, Fig. 1 is a sectional side elevation of the invention, Fig. 2 is a sectional end view of the invention, and Fig. 3 is an end view of the burner chamber.

The invention comprises a burner chamber for baking ovens of the rotary type which will be arranged substantially concentrically with respect to the oven and the revolving dough carrier in order to provide uniform heat to moving dough at any point within its travel.

The invention is adapted for utilization with any type of baking oven having a revolving dough carrier. The oven, as illustrated in the drawings, comprises an elongated casing 1, oval in cross section, having legs 2 on each side of the end walls 4 and 5, for supporting the casing 1. Such casing is provided with a door 3 to permit access to the interior of the casing when desired, and portions of the curved walls of the casing may be removable, if desired, in the ordinary manner, for convenience in operating the oven.

The end wall 4 of the casing is provided with a substantially concentric aperture 6 having its edges inwardly turned to form an annular flange 7. The opposite end wall 5 is provided with a similar aperture 8 having a similar inwardly turned flange 9.

Disposed centrally within the casing 1, is a burner chamber 10, which is preferably oval in cross section and constructed of any suitable material, preferably sheet metal. The upper opposite ends of the chamber 10 are slightly extended to provide rings 11, preferably split at their lower ends, which are adapted to snugly engage the flanges 7 and 9 for supporting the burner chamber in position. Mounted in the aperture 8 is a fuel mixer 12, adapted to be supplied with fuel by a supply pipe 13. Attached to the mixer 12 and extending through the chamber 10 is a pipe 14, provided with openings 15, forming a burner. The opposite end of the pipe 14 is closed by a suitable cap 17 and the pipe 14 is supported in the chamber 10 by means of brackets 18 attached thereto. As stated, the heating chamber 10, is preferably of greater depth than the width, and the burner pipe 14 is preferably downwardly curved adjacent the mixer 12 and extends through the heating chamber preferably adjacent the floor thereof. This arrangement has been found to distribute the heat in the most efficient manner. The aperture 6 is left open or supplied with an outlet pipe as desired to carry off the products of combustion. Mounted on the flanges 7 and 9, between the end walls 4 and 5 and the rings 11 are gears 19 and 20 which carry pivoted brackets 21 on their inner faces adapted to support shelves 22, which are carried thereby around the heating chamber 10, the shelves 22 of course automatically righting themselves as the gears 19 and 20 revolve. A driving shaft 23 is provided, preferably at the upper end of the casing 1, which has pinions 24 engaging the gears 19 and 20 to synchronously drive the same. The shaft 23 also has mounted thereon exterior of the casing 1, a pulley 25 which may be connected in any suitable manner to a source of power.

By this arrangement, a uniform heat is distributed in all directions, and the material carried by the revolving shelves is at all times within the zone of the most intense heat, as contrasted with ovens having the burners located in the bottom of the casing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In combination with a rotary oven having a carrier axially mounted therein; a plurality of shelves pivotally mounted adjacent the periphery of said carrier; and a heating chamber mounted co-axially with said carrier and having a portion offset with respect to the axis thereof.

2. In combination with a rotary oven having a carrier axially mounted therein; a plurality of shelves pivotally mounted adjacent the periphery of said carrier; a heating chamber mounted co-axially with said carrier and having a portion thereof offset with respect to the axis of said carrier; and heating means entering said oven at the axis of the carrier and being curved to extend adjacent the bottom of said offset portion.

3. In combination with a rotary baking oven; inwardly turned bearings on the end walls of said oven; a revolving carrier axially mounted adjacent said bearings; a plurality of shelves pivotally mounted on the periphery of said carrier; and a heating chamber substantially oval in cross section adapted to be mounted on said bearings and to depend in an offset position with respect to the axis of said carrier.

4. In combination with a baking oven, apertures in the end walls of said oven having inwardly turned flanges surrounding same; gears mounted on said flanges; shelves pivotally mounted on said gears; and a heating chamber mounted on said flanges and communicating with said apertures; said heating chamber having a portion thereof offset with respect to the axis of said gears.

5. In combination with a baking oven, apertures in the end walls of said oven having inwardly turned flanges surrounding same; gears mounted on said flanges; shelves pivotally mounted on said gears; a heating chamber mounted on said flanges and communicating with said apertures, said heating chamber having a portion thereof offset with respect to the axis of said gears; and a burner projecting through one of said apertures and extending adjacent the bottom of said heating chamber.

6. The combination with a rotary baking oven, a burner chamber adapted to be mounted within the revolving carrier of said oven; apertures in the end walls of said oven and inwardly turned flanges surrounding said apertures; sockets in said burner chamber engaging said flanges; a mixer mounted in one of said apertures; a curved perforated burner pipe attached to said mixer and extending through said chamber adjacent the floor thereof; gears mounted on said flanges and held in position by said sockets; shelves mounted on said gears and revolving therewith; and means for synchronously driving said gears, substantially as described.

In testimony whereof I have signed my name to this specification in the presence of two subscribing witnesses.

HENRY EICHNER.

Witnesses:
JOSHUA R. H. POTTS,
FREDA C. APPLETON.